United States Patent [19]

Roberts

[11] Patent Number: 5,113,551

[45] Date of Patent: May 19, 1992

[54] VERIFIABLE SWAGED FITTING

[75] Inventor: John D. Roberts, York, Pa.

[73] Assignee: Lift-All Company, Inc., Manheim, Pa.

[21] Appl. No.: 498,271

[22] Filed: Mar. 23, 1990

[51] Int. Cl.⁵ .............................................. A44B 21/00
[52] U.S. Cl. ................................. 24/115 A; 24/20 W
[58] Field of Search .............. 24/115 A, 20 W, 23 W,
24/659, 660, 587, 90 A; 29/407, 412

[56] References Cited

U.S. PATENT DOCUMENTS

| | | | |
|---|---|---|---|
| 1,368,480 | 2/1921 | Brown | 29/518 |
| 1,999,034 | 4/1935 | Clark | 24/90 A |
| 2,346,412 | 4/1944 | Bratz | 29/518 |
| 2,476,731 | 7/1949 | Hobbs, Jr. | 29/518 |
| 2,849,771 | 9/1958 | Rohland | 29/518 |
| 2,889,603 | 6/1959 | Joy | 29/518 |
| 2,895,195 | 7/1959 | Ehmann | 29/518 |
| 3,416,197 | 12/1968 | Mark | 24/115 A |
| 3,422,529 | 1/1969 | Nuding | 29/518 |
| 3,526,740 | 10/1950 | Gilmore | 29/518 |
| 3,640,317 | 2/1972 | Panfili | 24/20 W |
| 3,807,025 | 4/1974 | Gudmestad | 29/412 |
| 4,000,557 | 1/1977 | Bawden | 29/518 |
| 4,059,866 | 11/1977 | Rohland | 24/115 A |
| 4,829,641 | 5/1989 | Williams | 24/587 |

FOREIGN PATENT DOCUMENTS 0242231 2/1961 Australia .............. 24/20 W

Primary Examiner—Victor N. Sakran
Attorney, Agent, or Firm—Martin Fruitman

[57] ABSTRACT

A method and apparatus for assuring that a swaged fitting which is compressed upon a cable or holds an assembly together has been properly processed. A coating which changes when pressure is applied to it is placed on the outside of the swage fitting before it is subjected to the swaging step of the assembly procedure. This coating is then damaged, discolored or otherwise modified by the pressure applied to the swage fitting during swaging, so that a simple visual inspection can determine if an assembly has missed the swaging operation.

4 Claims, 1 Drawing Sheet

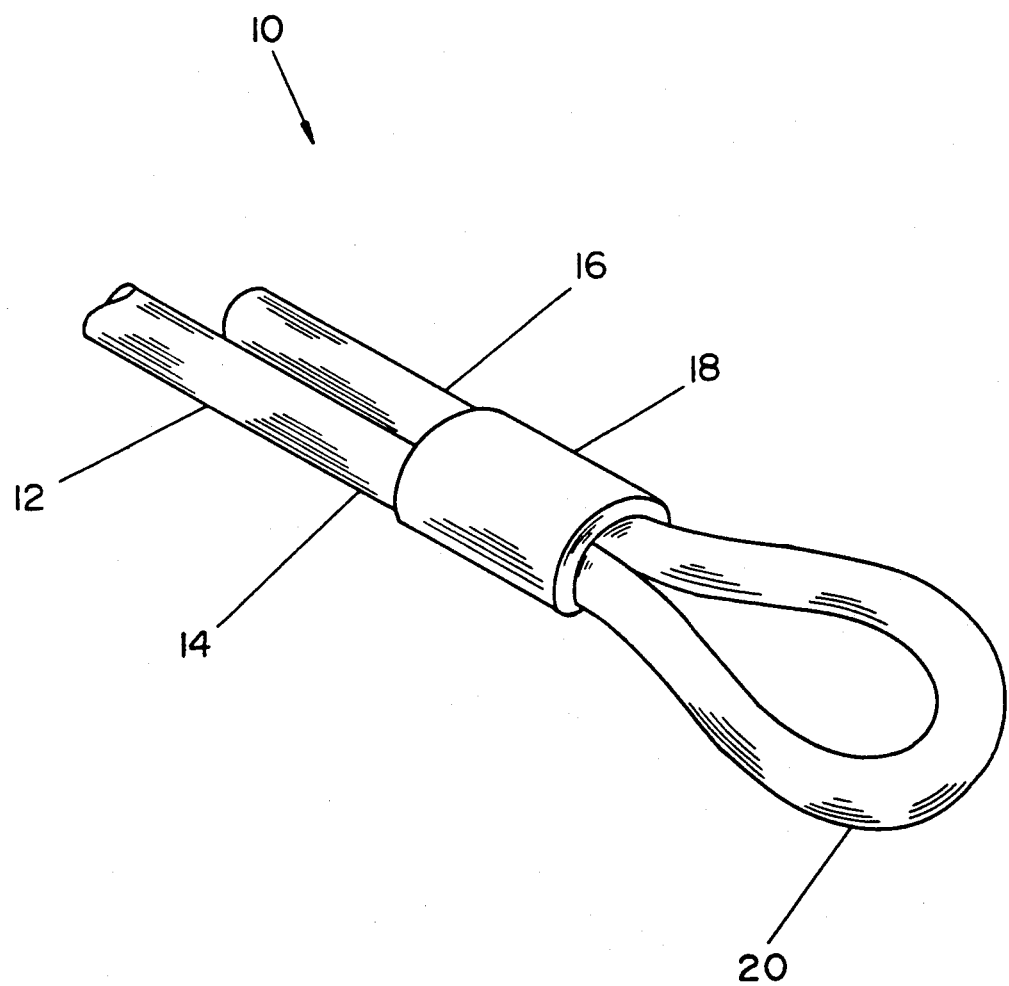

5,113,551

VERIFIABLE SWAGED FITTING

SUMMARY OF THE INVENTION

This invention deals generally with a process and apparatus of mechanical manufacture and more specifically with joining cables together and attaching fittings to cables by compressing a sleeve around the cables.

The apparatus and process of swaging is well understood and commonly used in the art of assembling cables and wires. Not only are there numerous patents showing the process, but virtually every electrician in the country has the tools for swaging, and regularly splices wires and attaches connectors by compressing sleeves around wires with a plier-like hand tool. Most such hand swaging systems deform the sleeve by the use of a tool which compresses the sleeve at a single point. Thus, when the operation is complete, the sleeve has an obvious deformity in it, usually, a simple depression, and a subsequent inspection will clearly indicate if the swaging process has been applied to a particular part.

There is, however, another process, more commonly used in manufacturing of larger cables, which does not so obviously deform the swage sleeve or swage fitting, and therefore presents a problem with verification to assure that the procedure has been performed.

When assembling together two or more large, multistrand, cables, gathering the strands of a single cable or attaching fittings to cables, the process which is commonly used is to compress a sleeve around the cable or cables with equal force all around the sleeve. While this changes the dimensions of the sleeve to some extent, the difference between a sleeve which has been swaged in such a manner and one which has not been processed is frequently not at all apparent to the eye. It is quite possible for a cable assembly which has not been properly swaged to be treated as if it has, and to be shipped as a completed product. This is particularly a problem in assemblies with very large cables, since the friction between cables gives them a stability which sometimes prevents them from separating during handling, or even when intentionally pulled, for instance during an inspection after manufacture.

Nevertheless, when placed into service such incompletely assembled cables are not only unsatisfactory, but can prove to be a very dangerous hazard. For instance, many lifting slings are made by just such a construction process, and if such a sling comes apart while lifting a heavy load, the results can be disastrous.

The present invention helps prevent such problems by furnishing a means for visually verifying whether a sleeve has been processed by the swaging step of the manufacturing procedure. This is accomplished quite simply by coating each sleeve with an unstable layer on its outside surface. This coating is applied during the manufacture of the sleeve, and the coating is selected so that it will change its appearance when subjected to the swaging operation.

In the preferred embodiment of the invention, the outside surface of each sleeve which will be used to construct lifting slings or other material handling products is zinc plated with a thin layer of yellow colored dichromate, and this thin layer actually changes its color intensity when it is subjected to the pressure of the swaging step.

Therefore, when a cable assembly with an improper shade of color is seen, it is apparent that the assembly has not yet been swaged. Although an experienced inspector can recognize the improper color shade even when it is isolated from other assemblies, the system permits even less experienced personnel at later stages of processing to pick out an improperly processed assembly among many properly processed ones, because of its different appearance.

Aside from the added safety benefit from the swaging verification system, there is a direct manufacturing benefit. Whereas, in the previously unverifiable manufacturing procedure, an unswaged assembly could leave the manufacturing plant and eventually be destroyed, the present invention permits such assemblies to be retrieved and reprocessed into satisfactory product, thus saving not only time and money, but also preventing customer dissatisfaction.

By the simple means of using a swaging sleeve with a coating which is changed by the subsequent swaging operation, the present invention assures that no unprocessed assemblies will pass through the entire manufacturing procedure, and therefore adds dramatically to the safety of the finished product.

BRIEF DESCRIPTION OF THE DRAWING

The FIGURE is a perspective view of a typical assembly to which the present invention is applied.

DETAILED DESCRIPTION OF THE INVENTION

The FIGURE depicts a typical cable assembly 10 to which the present invention is applied. As shown in the FIGURE, individual cable 12 is looped back upon itself, and leg 14 is swaged to leg 16 by compressing sleeve 18 around the two legs of cable 12 to form eye 20, thus forming one end of a lifting sling.

The art of assembling together such cables is well established in the art, and the actual process of swaging cables together to form such an assembly is not a part of this invention.

Instead, the invention deals with the apparatus and process for producing such an assembly in a manner which permits simple visual verification that the assembly has, in fact, been properly swaged together by the compression of sleeve 18 around cable legs 14 and 16.

It should be understood that the invention described here is not limited to the particular assembly pictured, but can be applied to any swaged assembly.

The key to the invention is that sleeve 18 includes on its outer surface a coating which changes characteristics when subjected to the compression of the swaging step which clamps sleeve 18 around legs 14 and 16 of cable 12. In the preferred embodiment this coating comprises zinc plating and dichromate of a combined thickness in the range of between 0.0001 inch and 0.005 inch which results in a yellow color on the outside surface of sleeve 18 before swaging, and the color changes to a distinctly lighter shade when subjected to the pressure of the swaging step.

The particular color is, of course, not important, and in fact, a variety of colors can be used to considerable advantage. For instance, different colors can be used for different size sleeves in order to facilitate identification of the sleeves with their appropriate cable assemblies.

Moreover, color need not be the characteristic which changes with pressure. It is also practical to coat sleeves with any layer which is poorly adhered to the sleeves, so that mere contact with the swaging tool is sufficient to detach all or portions of the coating, making the difference between a swaged and an unswaged sleeve the difference between a spotty and a consistent coating. For such a system, a simple water based paint would likely suffice.

Regardless of the particular coating used, the coating's essential characteristic is that it be changed sufficiently by the swaging process so that its appearance after swaging is visually distinguishable from its appearance before the part upon which it is coated was swaged.

When such sleeve in a production run has such a coating, there is little likelihood that any assembly will slip through without being properly swaged, and the field failure of such unprocessed assemblies is virtually eliminated.

It is to be understood that the form of this invention as shown is merely a preferred embodiment. Various changes may be made in the function an arrangement of parts; equivalent means may be substituted for those illustrated and described; and certain features may be used independently from others without departing from the spirit and scope of the invention as defined in the following claims.

For example, the invention can be used on products other than simple sleeves, so that button ends, ferrules, threaded studs, and various socket attachments can also be attached to cables by the use of this invention. Moreover, the shape of the sleeve used with the invention is not limited to cylindrical configurations, but sleeves can also be tapered or have any configuration of internal opening, such as oblong or elliptical.

What is claimed as new and for which Letters Patent of the United States are desired to be secured is:

1. A swage fitting comprising:
   a body which is deformable so that an interior cross section dimension is reduced when the body is subjected to external pressure; and
   a coating located on an outside surface of the body, the coating being of such a nature that it changes at least one of its visual characteristics when the body is subjected to external pressure sufficient to reduce the interior cross section of the body, wherein the visual characteristic of the coating which changes when it is subjected to pressure is color.

2. The swage fitting of claim 1 wherein the body is a cylinder and the coating is located on the outside cylindrical surface.

3. The swage fitting of claim 1 wherein the coating comprises zinc plating and dichromate.

4. The swage fitting of claim 1 wherein the coating is of a total thickness in the range of between 0.0001 inch and 0.005 inch.

* * * * *